(12) United States Patent
Kharitoneko et al.

(10) Patent No.: US 6,982,752 B2
(45) Date of Patent: Jan. 3, 2006

(54) CIRCUIT AND METHOD FOR CORRECTING A DIGITAL COLOR SAMPLED SIGNAL

(75) Inventors: Igor Kharitoneko, Thornleigh (AU); Chaminda Weerasinghe, Bella Vista (AU); Susan Twelves, Coogee (AU)

(73) Assignee: Motorola, Inc, Schaumburg, IL (US)

( * ) Notice: Subject to any disclaimer, the term of this patent is extended or adjusted under 35 U.S.C. 154(b) by 889 days.

(21) Appl. No.: 09/938,046

(22) Filed: Aug. 23, 2001

(65) Prior Publication Data

US 2004/0201724 A1    Oct. 14, 2004

(51) Int. Cl.
  *H04N 5/235*  (2006.01)
  *H04N 5/217*  (2006.01)
  *G06K 9/00*  (2006.01)

(52) U.S. Cl. ................... 348/222.1; 348/241; 382/167
(58) Field of Classification Search ............... 382/160, 382/167, 264; 48/222.1; 348/223.1, 241, 348/266, 272, 254, 655, 671, 659, 222.1; 358/518, 530
See application file for complete search history.

(56) References Cited

U.S. PATENT DOCUMENTS

| | | | | | |
|---|---|---|---|---|---|
| 4,754,323 | A | * | 6/1988 | Kaji et al. | 348/256 |
| 5,671,023 | A | * | 9/1997 | Nishiwaki et al. | 348/675 |
| 6,259,811 | B1 | * | 7/2001 | Tsuji | 382/166 |
| 6,515,700 | B2 | * | 2/2003 | Nakamura et al. | 348/256 |

FOREIGN PATENT DOCUMENTS

WO    WO 00/10331    2/2000

OTHER PUBLICATIONS

A.J. Blanksby, "Performance Analysis of a color CMOS Photogate Image Sensor", IEEE Transaction on Electronic Devices vol. 47, NIJ, Jan. 2000, pp. 55-62.

Yun Ho Jung, Jae Seok Kim, Bong Soo Hur and Moon Gi Kang, Department of Electronic Engineering, Yonsel University, Seoul, Korea, "Design of Real-Time Image Enhancement Preprocessor for CMOS Image Sensor", IEEE Transactions on Consumer Electronics, vol. 46 N1, Feb. 2000, pp. 68-74.

Takao Toi, Silicon Systems Research Laboratories, NEC Corp. Kanagawa, Japan, "Color Signal Processing Technique for Single-Chip CCD Cameras that Employ CPUs with SIMD Instruction Sets", IEEE Transactions on Consumer Electronics, vol. 46 N2, Feb. 2000, pp. 291-294.

* cited by examiner

*Primary Examiner*—Wendy R. Garber
*Assistant Examiner*—Justin Misleh

(57) ABSTRACT

A method and a color correction circuit (2) for color correcting a digital color sampled signal. The color correction circuit (2) has three color input channel processing circuits (31,32,33) each of the color input channel processing circuits (31,32,33) has an adder (34) with a corrected color channel output □ a first multiplied input, a second multiplied input, a third multiplied input and an uncorrected color channel input providing for direct coupling the adder to an output of a color image sensor. The processing circuits (31,32,33) have a Low Pass Filter (35,39,40) with a filter input coupled to the uncorrected color channel input. The processing circuits (31,32,33) each also have input channel multipliers (36,42,46) and two further multipliers all having an output coupled to inputs of a respective adder (34,41,45).

12 Claims, 3 Drawing Sheets

CIRCUIT AND METHOD FOR CORRECTING A DIGITAL COLOR SAMPLED SIGNAL

FIELD OF THE INVENTION

This invention relates to correcting colors generated by image sensors. This invention is particularly useful for, but not limited to, correcting colors generated by solid-state image sensors such as Complementary Metal Oxide Semiconductor (CMOS) image sensors that are particularly prone to generating noise.

BACKGROUND ART

Color solid-state image sensors typically have a spectral sensitivity that differs from colors that are perceived by the human eye. Consequently, colors of an image perceived by a human eye tend to differ from colors generated by solid state image sensors. To improve the color reproduction accuracy, digital cameras with image sensors having Red, Green and Blue (R, G, B) output channels usually perform color correction with a 3×3 color correction matrix. Ideally, the matrix has matrix coefficients that are optimized to improve color fidelity. A method of adjusting matrix coefficients to improve color fidelity is described in published patent specification WO 00/10331. The method described may work well with Charged Coupled Device (CCD) sensors that have very low level of noise. However, CMOS image sensors inherently suffer from thermal noise and fixed pattern noise. Accordingly, this method of adjusting matrix coefficients is not ideally suited to CMOS image sensors as the coefficients tend to amplify noise thereby significantly affecting image quality.

The problem of noise amplification by color correction is reported in the publication *"Performance Analysis of a Color CMOS Photogate Image Sensor"*, IEEE Transactions on Electronic Devices Vol. 47, N1J January 2000. Noise performance is suggested to be resolved by improving the sensor quantum efficiency rather than by color correction methods.

In the publication *"Design of real-time Image Enhancement Preprocessor for CMOS Image Sensor"*, IEEE Transactions on Consumer Electronics, Vol.46 N1, 2000. Color correction hardware complexity is assessed rather than noise amplification problems. Complexity is an important issue especially if the color correction is to be implemented directly on the CMOS sensor chip. Nevertheless, the problem of noise affecting image quality is not addressed in this publication.

Another approach to reduce color correction complexity is proposed in *"Color Signal Processing Technique for Single-Chip CCD Cameras That Employ CPUs with SIMD Instruction Sets"*, IEEE Transactions on Consumer Electronics, Vol.46 N2, 2000. The color correction technique described operates directly on Color Filter Array samples. The technique is implemented as a vector operation and does not address noise amplification.

SUMMARY OF THE INVENTION

According to one aspect of the invention there is provided a color correction circuit having at least three color input channel processing circuits, each of said color input channel processing circuits comprising:

an adder with a corrected color channel output and an uncorrected color channel input;

a noise reduction filter having a filter input coupled to said uncorrected color channel input;

an input channel multiplier having an input coupled to an output of said noise reduction filter, an output of said input channel multiplier being coupled to an input of said adder; and at least two further multipliers with inputs respectively coupled to outputs of other noise reduction filters forming part of the other color input channel processing circuits, said two further multipliers having outputs coupled to inputs of said adder.

Suitably, said multipliers for a color channel may have coefficients that when summed together are less than 0.2. Preferably, said coefficients for a color channel when summed together may be substantially zero.

Suitably, all said coefficients may be less than 1.

Preferably, said noise reduction filter may be a Low Pass Filter.

According to another aspect of the invention there is provided a camera having at least three color input channel processing circuits, each of said color input channel processing circuits comprising:

an adder with a corrected color channel output and an uncorrected color channel input;

a noise reduction filter having a filter input coupled to said uncorrected color channel input;

an input channel multiplier having an input coupled to an output of said noise reduction filter, an output of said input channel multiplier being coupled to an input of said adder; and at least two further multipliers with inputs respectively coupled to outputs of other noise reduction filters forming part of the other color input channel processing circuits, said two further multipliers having outputs coupled to inputs of said adder.

Suitably, said camera may also comprise a color interpolation module coupled to said color input channel processing circuits. There may also be a gamma correction module coupled to said color interpolation module.

According to another aspect of the invention there is provided a method of correcting a digital color sampled signal comprising at least three color channels, the channels being a Red Channel, Green Channel and Blue channel, the method comprising the steps of:

filtering uncorrected color sampled signals on each of said color channels to provide filtered channel sampled signals;

multiplying said filtered channel sampled signals with selected coefficients to provide noise reduced signal samples of said uncorrected color sampled signals; and adding each of said uncorrected color sampled signals to selected said noise reduced signal samples to provide a corrected color sampled signal.

Preferably, the coefficients for each said channel when summed together may be suitably less than 0.2. Preferably, said coefficients for each said channel when summed together may be substantially zero.

Suitably, the method may be further characterised by performing the following expression:

$$\begin{bmatrix} R_c \\ G_c \\ B_c \end{bmatrix} = \begin{bmatrix} 1 & 0 & 0 \\ 0 & 1 & 0 \\ 0 & 0 & 1 \end{bmatrix} \begin{bmatrix} R \\ G \\ B \end{bmatrix} + \begin{bmatrix} c_{11} & c_{12} & c_{13} \\ c_{21} & c_{22} & c_{23} \\ c_{31} & c_{32} & c_{33} \end{bmatrix} \begin{bmatrix} \overline{R} \\ \overline{G} \\ \overline{B} \end{bmatrix}$$

Wherein, $R_c$, $G_c$ and $B_c$ are respective color corrected samples of the uncorrected color sampled signals R,G,B; $\overline{R}$, $\overline{G},\overline{B}$ are respective filtered channel sampled signals of the uncorrected color sampled signals R,G,B; and $C_{11}$ to $C_{33}$ are the coefficients with values less then 1.

Preferably, the coefficients $C_{11}$, $C_{22}$ and $C_{33}$ may be positive.

BRIEF DESCRIPTION OF THE DRAWINGS

In order that the invention may be readily understood and put into practical effect, reference will now be made to a preferred embodiment as illustrated with reference to the accompanying drawings in which.

DETAILED DESCRIPTION OF THE PREFERRED EMBODIMENT OF THE INVENTION

Figure 1:
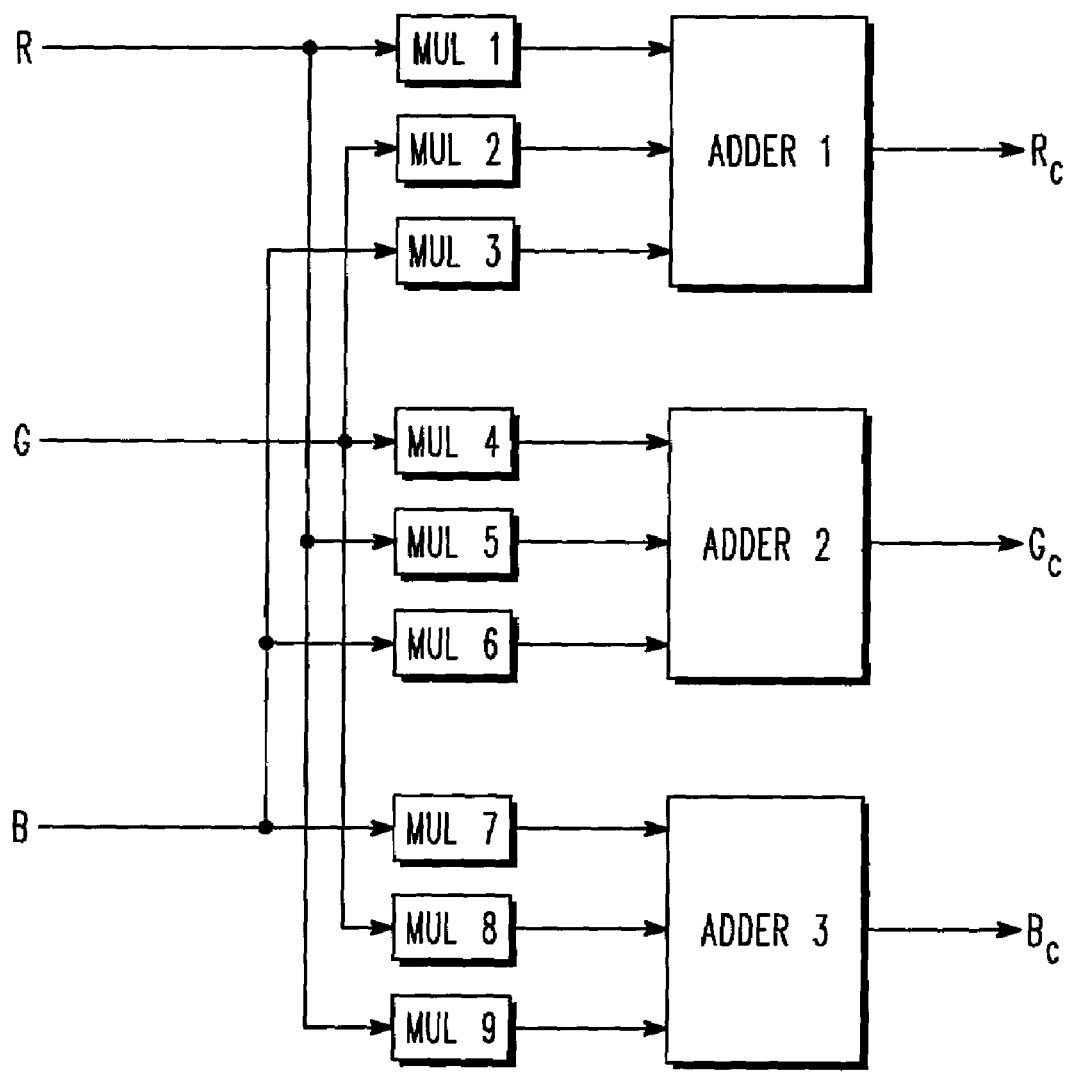
FIG. 1 is a block diagram of prior art color correction hardware.

With reference to FIG. 1 there is illustrated a block diagram of prior art color correction hardware as described in patent specification WO 00/10331. The function of the color correction hardware can be described by the following expression:

$$\begin{bmatrix} R_c \\ G_c \\ B_c \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix} \quad (1)$$

Where, R,G,B are uncorrected color samples generated at respective Red, Green and Blue output channels of a color image sensor; $R_c$, $G_c$ and $B_c$ are color corrected samples of the R,G,B digital samples; and $a_{11}$ to $a_{33}$ are matrix coefficients that are optimized to improve color fidelity. The matrix coefficients are selected for a specific sensor's spectral sensitivity. The main diagonal ($a_{11}$, $a_{22}$, $a_{33}$) of the matrix of expression -(1) usually comprises coefficients that are greater than 1.0, whereas other coefficients in a row have values less that 1.0 and one or both other coefficients in a row may have negative values that are between -1.0 and 0.0. Hence, as will be apparent to a person skilled in the art, in expression -(1), color correction for a selected digital sample of a color channel (R, G, B) is typically performed by subtracting weighted values (intensity or power) of digital samples on the other color channels from a weighted value of the selected digital sample. To further illustrate this color correction approach, expression -(1) is expanded as follows:

$$Rc = a_{11}R + a_{12}G + a_{13}B$$

$$Gc = a_{21}R + a_{22}G + a_{23}B$$

$$Bc = a_{31}R + a_{32}G + a_{33}B \quad (2)$$

An example of color correction coefficients for an image sensor (IS) is: Rc=+1.2R−0.5G−0.25B for channel R; Gc=−0.15R+1.4G−0.25B for channel G; and Bc=+0.01R−0.35G+1.7B for channel B. The coefficients are typically different for other image sensors having different spectral sensitivities to that of the image sensor IS. Unfortunately, this approach to color fidelity improvement is not ideally suited to CMOS image sensors as the matrix coefficients tend to amplify noise thereby significantly affecting image quality.

Figure 2:
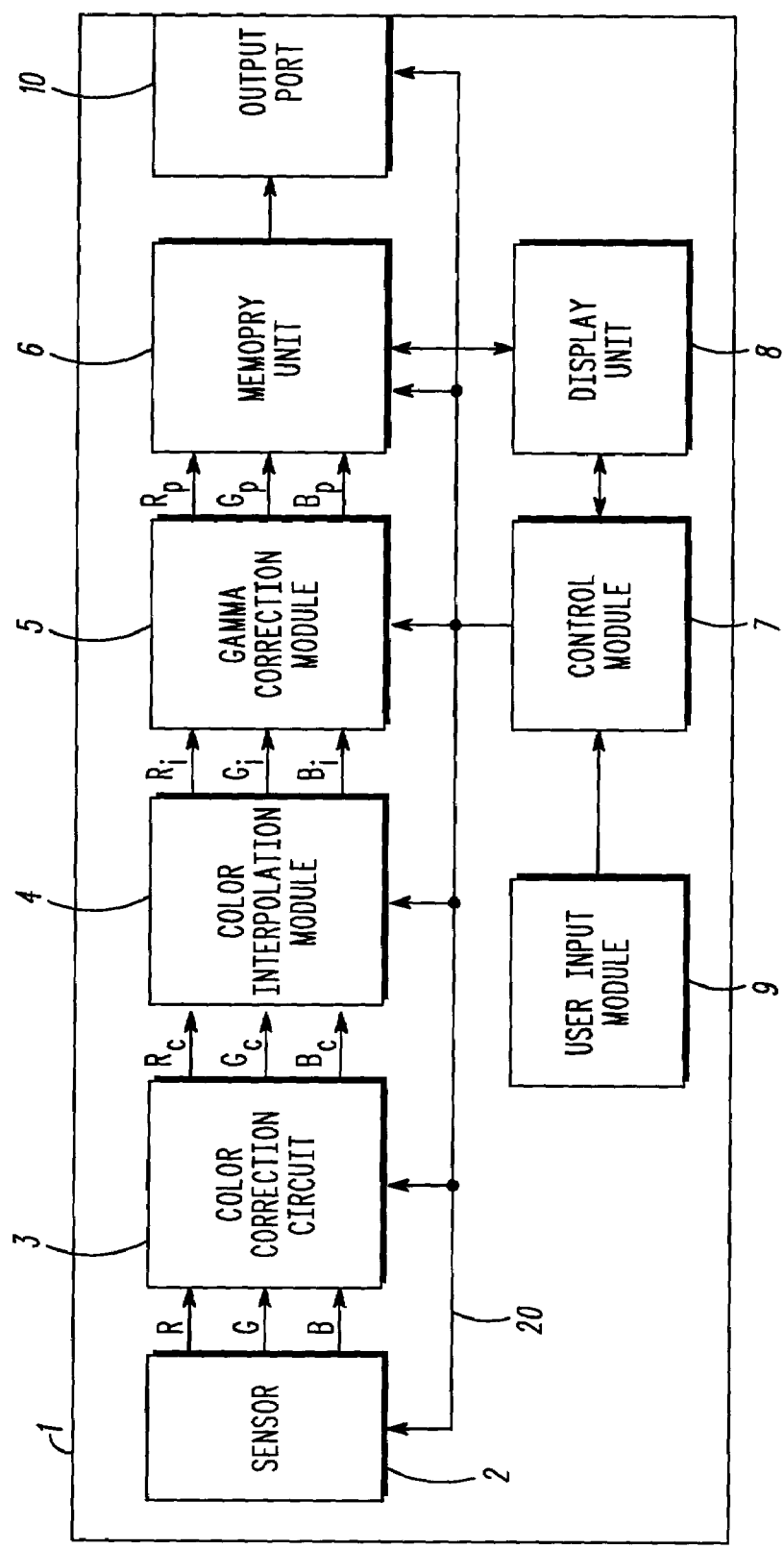
FIG. 2 is a block diagram of a camera in accordance with the present invention.

Referring to FIG. 2 there is illustrated a block diagram of a digital camera 1. Camera 1 includes an image sensor 2, typically a CMOS image sensor, having three color channel outputs, these being Red, Green and Blue color channel outputs that are coupled to a color correction circuit 3. The Red, Green and Blue color channel outputs provide uncorrected color sampled signals (R, G, B) to inputs of the color correction circuit 3. The camera 1 also has a color interpolation module 4 and a gamma correction module 5. The color correction circuit 3 and modules 4,5 perform image corrections to provide a resulting image of a desired quality comprising processed color sampled signals ($R_p$, $G_p$, $B_p$) on output channels of the gamma correction module 5. The output channels of the gamma correction module 5 are tri-state and are coupled to by a data bus to a memory unit 6. Hence, in operation the processed color sampled signals ($R_p$, $G_p$, $B_p$) are stored in the memory unit 6.

There is also a control module 7 coupled to a display unit 8 in the form of a Liquid Crystal Display for displaying an image comprising the processed color sampled signals ($R_p$, $G_p$, $B_p$) stored in the memory unit 6. The color interpolation module 4 and gamma correction module 5 are well known in the art and are therefore not described in detail. The color interpolation module 4 has three color input channels coupled to respective output channels of the color correction module 3. The gamma correction module 5 also has three input channels coupled to respective output channels of the color interpolation module 4. The output channels of the color correction module 3 provide corrected color sampled signals ($R_c$, $G_c$, $B_c$) and the output channels of the color interpolation module 4 provide interpolated color sampled signals ($R_i$, $G_i$, $B_i$).

The camera 1 also includes an user input module 9 coupled to provide command signals to the control module 7. There is also an output port 10 coupled by a common bus 20 to the control module 7 and the memory unit 6 is coupled to the output port 10 by a suitable bus. Further, the sensor 2, color correction circuit 3, color interpolation module 4, gamma correction module 5 and memory unit 6 are coupled by the common bus 20.

In use, images stored in the memory unit the that comprise processed color sampled signals ($R_p$, $G_p$, $B_p$) are displayed upon the display unit 8 in response to suitable commands provided from the user input module 9. Such sampled signals are obtained by the control module 7 controlling the Sensor 2, color correction circuit 3, modules 4,5 and memory unit 6 and display unit 8. Further, if user wished to transfer images stored on the memory unit 6, then by suitable commands effected by the user input module 9, images can be loaded onto a removable memory inserted into the output port 10.

Figure 3:
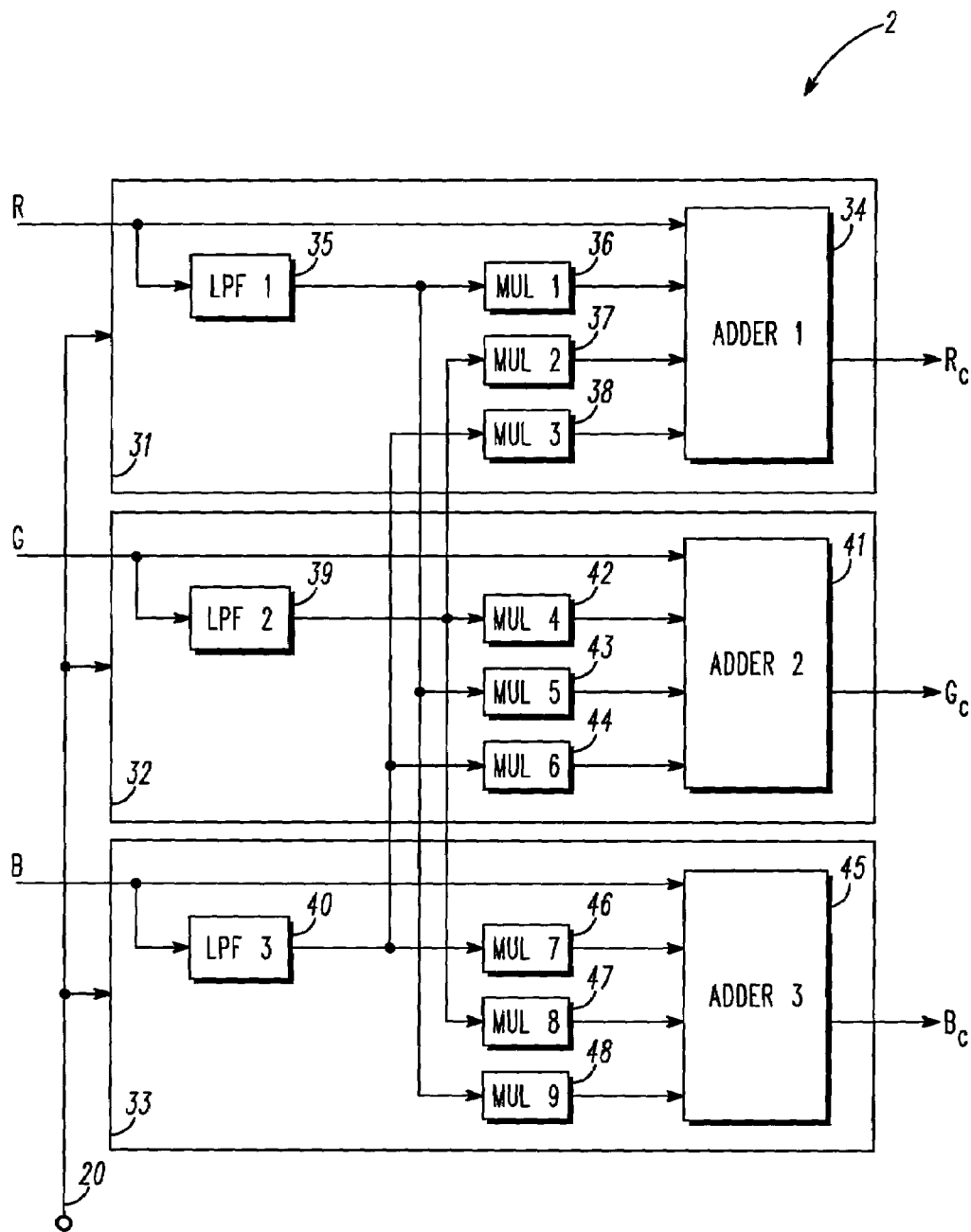
FIG. 3 is a block diagram of the image correction module in accordance with the present invention.

Referring to FIG. 3 there is illustrated a block diagram of the color correction circuit 3. The color correction circuit 3 has three color input channel processing circuits these being Red, Green and Blue color input channel processing circuits 31, 32 and 33 that are coupled channel outputs of the image sensor 2 to receive respective uncorrected color sample signals R,G,B.

The Red input channel processing circuit 31 comprises an adder 34 with an output, that is the corrected color channel output providing the corrected color signal sample $R_c$, and an uncorrected color Red channel input directly coupled to the Red color channel output of the image sensor 2. The Red Input channel processing circuit 31 also has a noise reduction filter which is a Low Pass Filter 35 with an input coupled to the uncorrected Red color channel input. There is also an input channel multiplier 36 having an input coupled to an output of the Low Pass Filter 35 and an output of the input channel multiplier 36 is coupled to an input of the adder 34. The Input channel processing circuit 31 also includes two further multipliers 37, 38 with inputs respectively coupled to outputs of other noise reduction filters in the form of Low Pass Filters 39, 40 forming part of the Green and Blue color input channel processing circuits 32,33. The two further multipliers 37,38 have outputs coupled to inputs of adder 34, therefore adder 34 is a four bit adder with four inputs and a tri-state output. The common bus 20 is also coupled to each of the color input channel processing circuits 31, 32,33 thereby allowing for different coefficients to be loaded into the multipliers 36,37,38,42, 43,44,46,47,48.

The Green input channel processing circuit 32 comprises an adder 41 with a corrected color channel output, that is the corrected color channel output providing the corrected color signal sample $G_c$, and an uncorrected color Green channel input G directly coupled to the Green color channel output of the image sensor 2. The Input channel processing circuit 32 also includes the noise reduction Low Pass Filter 39 with an input coupled to the uncorrected Green color channel input. There is also an input channel multiplier 42 having an input coupled to an output of the Low Pass Filter 39 and an output of the input channel multiplier 42 is coupled to an input of the adder 41. The Green Input channel processing circuit 32 also includes two further multipliers 43, 44 with inputs respectively coupled to outputs of the other noise reduction Low Pass Filters 35, 40 forming part of the Red and Blue color input channel processing circuits 31,33. The two further multipliers 43,44 have outputs coupled to inputs of adder 41, therefore adder 41 is a four bit adder with four inputs and a tri-state output.

The Blue input channel processing circuit 33 comprises an adder 45 with a corrected color channel output providing the corrected color signal sample $B_c$, and an uncorrected color Blue channel input directly coupled to the Blue color channel output of the image sensor 2. The Input channel processing circuit 33 also includes the noise reduction Low Pass Filter 40 with an input coupled to the uncorrected Blue color channel input. There is also an input channel multiplier 46 having an input coupled to an output of the Low Pass Filter 40 and an output of the input channel multiplier 46 is coupled to an input of the adder 45. The Blue Input channel processing circuit 33 also includes two further multipliers 47, 48 with inputs respectively coupled to outputs of the other noise reduction Low Pass Filters 35, 39 forming part of the Red and Green color input channel processing circuits 31,32. The two further multipliers 47,48 have outputs coupled to inputs of adder 45, therefore adder 45 is a four bit adder with four inputs and a tri-state output.

The function of the color correction circuitry 3 can be described by the following expression:

$$\begin{bmatrix} R_c \\ G_c \\ B_c \end{bmatrix} = \begin{bmatrix} 1 & 0 & 0 \\ 0 & 1 & 0 \\ 0 & 0 & 1 \end{bmatrix} \begin{bmatrix} R \\ G \\ B \end{bmatrix} + \begin{bmatrix} a_{11}-1 & a_{12} & a_{13} \\ a_{21} & a_{22}-1 & a_{23} \\ a_{31} & a_{32} & a_{33}-1 \end{bmatrix} \begin{bmatrix} \overline{R} \\ \overline{G} \\ \overline{B} \end{bmatrix} \quad (3)$$

Where $a_{11}$ to $a_{33}$ are identical to coefficients that would be selected for an image sensor when using expression (1); and $\overline{R},\overline{G},\overline{B}$ are filtered samples of the uncorrected color samples R,G,B.

If the image sensor is identical to the image sensor as referred to above in relation to expression (1) and (2), then coefficients on the main diagonal of the matrix are modified so each coefficient in the main diagonal is typically less than 1. Therefore, expression (3) in a more general form can be expressed as follows:

$$\begin{bmatrix} R_c \\ G_c \\ B_c \end{bmatrix} = \begin{bmatrix} 1 & 0 & 0 \\ 0 & 1 & 0 \\ 0 & 0 & 1 \end{bmatrix} \begin{bmatrix} R \\ G \\ B \end{bmatrix} + \begin{bmatrix} c_{11} & c_{12} & c_{13} \\ c_{21} & c_{22} & c_{23} \\ c_{31} & c_{32} & c_{33} \end{bmatrix} \begin{bmatrix} \overline{R} \\ \overline{G} \\ \overline{B} \end{bmatrix} \quad (4)$$

Where $C_{11}$ to $C_{33}$ are coefficients having values that all typically less then 1. When expanded, expression (4) becomes:

$$R_c = R + c_{11}\overline{R} + c_{12}\overline{G} + c_{13}\overline{B}$$

$$G_c = G + c_{22}\overline{G} + c_{21}\overline{R} + c_{23}\overline{B}$$

$$B_c = B + c_{33}\overline{B} + c_{31}\overline{R} + c_{32}\overline{G} \quad (5)$$

Hence, for the image sensor (IS), the color corrected sampled signals would have the following values for each sample:

$$R_c = R + 0.2\overline{R} - 0.5\overline{G} - 0.25\overline{B} \text{ for channel } R;$$

$$G_c = G + 0.4\overline{G} - 0.15\overline{R} - 0.25\overline{B} \text{ for channel } G; \text{ and}$$

$$B_c = B + 0.7\overline{B} + 0.01\overline{R} - 0.35\overline{G} \text{ for channel B.}$$

The color correction circuit 3 uses the three Low Pass Filters 35,39,40 to produce the $\overline{R},\overline{G},\overline{B}$ values. A straightforward application of the Low Pass Filters 35,39,40 would have a negative impact on image sharpness therefore causing image blur. This invention avoids the undesirable introduction of blur by combining the Low Pass Filters 35,39,40 as shown. As a result, blur introduced by a single LPF is compensated through combining data from several color channels. Thus, whilst suppressing the noise, the color correction circuitry 3 also preserves the original sharpness of the images. Uncorrected color samples of the Red, Green and Blue color channels are respectively applied directly to the adders 34,41,45. The low-pass filtered versions of the samples of the Red, Green and Blue color channels are multiplied with the corresponding color correction coefficients before being added to the respective uncorrected color samples. Thus, the corrected color sampled signal ($R_c$, $G_c$ and $B_c$) are the result of a combination of the uncorrected color samples and a noise reduced signal sample that has been low-pass filtered and multiplied by selected coefficients.

Advantageously, the present invention performs a method of correcting a digital color sampled signal comprising a Red Channel, Green Channel and Blue channel by filtering uncorrected color sampled signals on each of the color channels to provide filtered channel sampled signals. The color correction circuitry 3 provides for multiplying the filtered channel sampled signals with selected coefficients to provide noise reduced signal samples of uncorrected color sampled signals. Also, the color correction circuitry 3 performs adding each of the uncorrected color sampled signals to selected noise reduced signal samples to provide a corrected color sampled signal. Typically, the coefficients for each channel, when summed together, are suitably less than 0.2 and usually the coefficients for each channel, when summed together, are substantially zero. Since the sum of the coefficients for each channel are less than 1, the square of the coefficients are even smaller. Since fixed pattern noise is amplified or attenuated depending on the value of the square of the coefficients, this noise is substantially reduced. Further, the small size of sum of the coefficients for each channel substantially reduces blur introduced by the Low Pass Filters 35, 39 and 40.

Although the invention has been described with reference to a preferred embodiment, it is to be understood that the invention is not restricted to the particular embodiment described herein. For example, the color interpolation module 4 may be directly couple to the image sensor 2 and therefore provide sampled signals to the color correction circuit 3.

We claim:

1. A color correction circuit having at least three color input channel processing circuits, each of said color input channel processing circuits comprising:
   an adder with a corrected color channel output, a first multiplied input, a second multiplied input, a third multiplied input and an uncorrected color channel input directly coupling the adder to an output of a color image sensor;
   a noise reduction filter having a filter input coupled to said uncorrected color channel input;
   an input channel multiplier having an input coupled to an output of said noise reduction filter, an output of said input channel multiplier being coupled to the first multiplied input of said adder; and
   at least two further multipliers having inputs respectively coupled to outputs of other noise reduction filters forming part of other color input channel processing circuits, one of said two further multipliers having an output coupled to the second multiplied input and other one of said two further multipliers having an output coupled to the third multiplied input.

2. A color correction circuit as claimed in claim 1, wherein said input channel and two further multipliers have coefficients that when summed together are less than 0.2.

3. A color correction circuit as claimed in claim 1 wherein said input channel and two further multipliers have coefficients that when summed together are substantially zero.

4. A color correction circuit as claimed in claim 1, wherein said input channel and two further multipliers have coefficients that when summed together are less than 1.

5. A color correction circuit as claimed in claim 1 wherein said noise reduction filter is a Low Pass Filter.

6. A color correction circuit having a color image sensor having at least three uncorrected color channel outputs and at least three color input channel processing circuits, each of said color input channel processing circuits comprising:
   an adder with a corrected color channel output, a first multiplied input, a second multiplied input, a third multiplied input and an uncorrected color channel input directly coupling the adder to one of the uncorrected color channel outputs;
   a noise reduction filter having a filter input coupled to said uncorrected color channel input;
   an input channel multiplier having an input coupled to an output of said noise reduction filter, an output of said input channel multiplier being coupled to the first multiplied input of said adder; and
   at least two further multipliers having inputs respectively coupled to outputs of other noise reduction filters forming part of other color input channel processing circuits, one of said two further multipliers having an output coupled to the second multiplied input and other one of said two further multipliers having an output coupled to the third multiplied input.

7. A color correction circuit as claimed in claim 6, wherein there is a color interpolation module coupled to said color input channel processing circuits.

8. A color correction circuit as claimed in claim 7, wherein there is a gamma correction module coupled to said color interpolation module.

9. A method of correcting a digital color sampled signal comprising at least three color channels, the channels being a Red Channel, Green Channel and Blue channel, the method comprising the steps of:
   filtering uncorrected color sampled signals on each of said color channels to provide filtered channel sampled signals;
   multiplying said filtered channel sampled signals with selected coefficients to provide noise reduced signal samples of said uncorrected color sampled signals; and
   adding each of said uncorrected color sampled signals to selected said noise reduced signal samples to provide a corrected color sampled signal, wherein the coefficients when summed together are less than 0.2.

10. A method of correcting a digital color sampled signal as claimed in claim 9, wherein said coefficients used for said multiplying when summed together are substantially zero.

11. A method of correcting a digital color sampled signal as claimed in claim 9, said method being further characterised by performing the following expression:

$$\begin{bmatrix} R_c \\ G_c \\ B_c \end{bmatrix} = \begin{bmatrix} 1 & 0 & 0 \\ 0 & 1 & 0 \\ 0 & 0 & 1 \end{bmatrix} \begin{bmatrix} R \\ G \\ B \end{bmatrix} + \begin{bmatrix} c_{11} & c_{12} & c_{13} \\ c_{21} & c_{22} & c_{23} \\ c_{31} & c_{32} & c_{33} \end{bmatrix} \begin{bmatrix} \overline{R} \\ \overline{G} \\ \overline{B} \end{bmatrix}$$

Wherein, $R_c$, $G_c$ and $B_c$ are respective color corrected samples of the uncorrected color sampled signals R,G,B; $\overline{R},\overline{G},\overline{B}$ are respective filtered channel sampled signals of the uncorrected color sampled signals R,G,B; and $C_{11}$ to $C_{33}$ are the coefficients with values less then 1.

12. A method of correcting a digital color sampled signal as claimed in claim 11, wherein the coefficients $C_{11}$, $C_{22}$ and $C_{33}$ are positive.

* * * * *